(12) United States Patent
Lin

(10) Patent No.: US 7,561,354 B2
(45) Date of Patent: Jul. 14, 2009

(54) HOLDER AND LENS MODULE HAVING SAME

(75) Inventor: Mong-Tung Lin, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/777,039

(22) Filed: Jul. 12, 2007

(65) Prior Publication Data

US 2008/0239519 A1    Oct. 2, 2008

(30) Foreign Application Priority Data

Mar. 30, 2007   (CN) .......................... 200710200364

(51) Int. Cl.
*G02B 7/02* (2006.01)
*G02B 15/14* (2006.01)

(52) U.S. Cl. ...................... 359/819; 359/704

(58) Field of Classification Search .......... 359/694–824
See application file for complete search history.

(56) References Cited

U.S. PATENT DOCUMENTS

| | | | |
|---|---|---|---|
| 7,423,823 B2 * | 9/2008 | Naganuma et al. | 359/820 |
| 2007/0058072 A1 | 3/2007 | Lee | |
| 2008/0094488 A1 * | 4/2008 | Oishi et al. | 348/240.99 |

* cited by examiner

*Primary Examiner*—Mohammed Hasan
(74) *Attorney, Agent, or Firm*—Frank R. Niranjan

(57) ABSTRACT

An exemplary lens module includes a number of optical components, a barrel receiving the optical components therein, an image sensor and a holder engaged with the barrel. The holder receives the image sensor therein. The holder has an electromagnetic shielding coating formed thereon. The electromagnetic shielding coating is comprised of a polymeric matrix and a number of carbon nanotubes dispersed in the polymeric matrix and is configured for blocking electromagnetic interference from outside the holder. The lens module can block electromagnetic interference.

14 Claims, 2 Drawing Sheets

HOLDER AND LENS MODULE HAVING SAME

BACKGROUND

Technical Field

The present invention relates to holders and lens modules having the holders, and more particularly to a holder that is capable of shielding to prevent electromagnetic interference (EMI) and a lens module having the holder.

Nowadays, camera modules are now in widespread use. Camera modules are being combined with various portable electronic devices such as mobile phones, PDAs (personal digital assistants) and computers to be increasingly multi-functional.

A typical camera module generally includes a lens module. Generally, the lens module includes a holder, a barrel, a number of optical components such as optical lenses, filters received in the barrel and an image sensor. The barrel is partially received in the holder. The image sensor is generally held inside the holder, and disposed at a bottom of the holder or at the end of the barrel received in the holder. The optical components are coupled with the image sensor so as to capture images.

However, currently, the holder and the barrel are generally made of plastics, e.g., polycarbonate/acrylonitrile butadiene styrene (PC/ABS) and poly-tetrafluoroethylene (PTFE). The conventional holder and the barrel made of such materials are not capable of blocking electromagnetic radiation that may cause EMI. Therefore, the image sensor is prone to be affected by EMI. The EMI may deteriorate image quality. Although the holder and the barrel made of such materials usually have coatings formed thereon to block outside electromagnetic radiation, the shielding effects of these coatings are not always satisfactory.

What is needed, therefore, is a lens module with a holder having improved electromagnetic radiation shielding capability.

SUMMARY

One exemplary embodiment includes a lens module. The lens module includes a number of optical components, a barrel receiving the optical components therein, an image sensor, and a holder engaged with the barrel. The holder receives the image sensor therein. The holder has an electromagnetic shielding coating formed thereon. The electromagnetic shielding coating is comprised of a polymeric matrix and a number of carbon nanotubes dispersed in the polymeric matrix, and is configured for blocking electromagnetic radiation from outside the holder.

BRIEF DESCRIPTION OF THE DRAWINGS

Many aspects of the present lens module can be better understood with reference to the following drawings. The components in the drawings are not necessarily drawn to scale, the emphasis instead being placed upon clearly illustrating the principles of the present lens module. Moreover, in the drawings, like reference numerals designate corresponding parts throughout the several views.

DETAILED DESCRIPTION OF THE EMBODIMENTS

An embodiment will now be described in detail below and with reference to the drawings.

Figure 1:
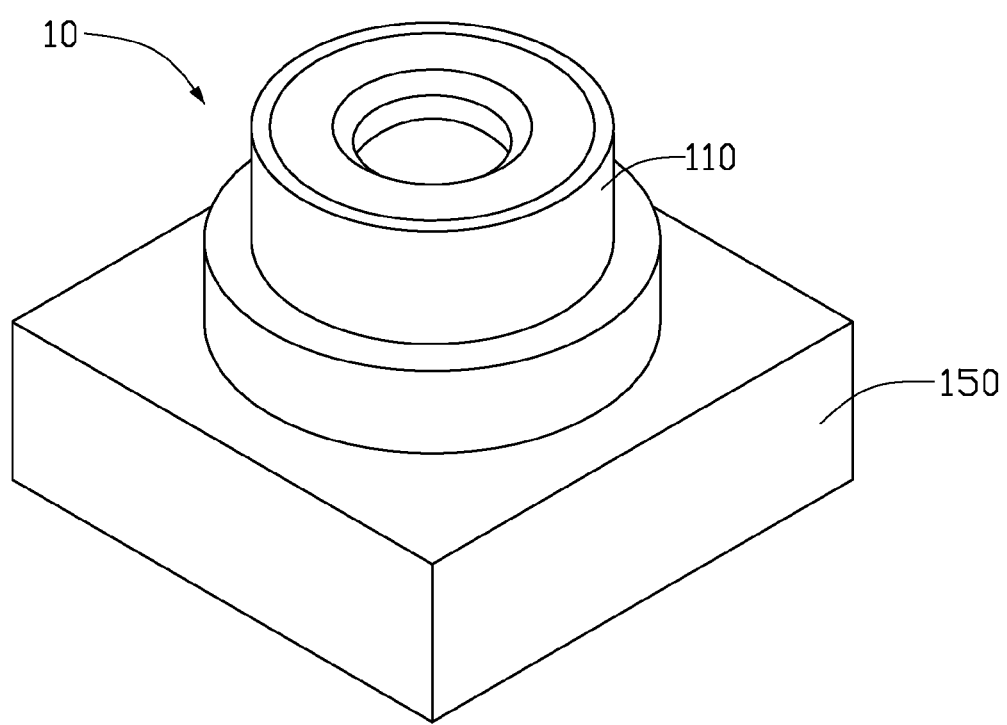
FIG. 1 is a schematic view of a lens module according to an exemplary embodiment.
Figure 2:
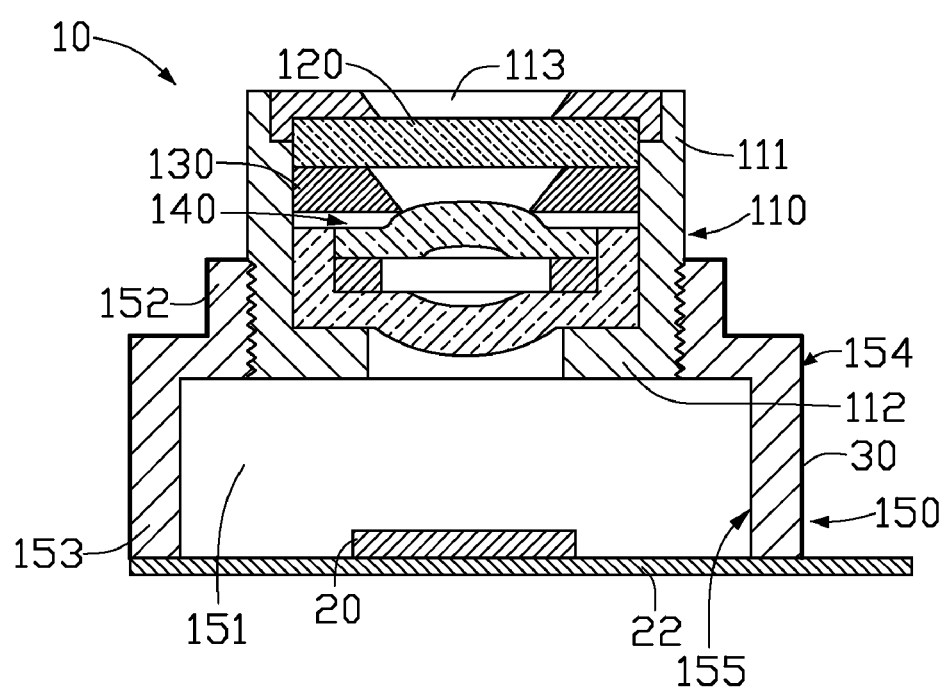
FIG. 2 is a schematic, cross-sectional view of the lens module shown in FIG. 1.

Referring to FIG. 1 and FIG. 2, an exemplary lens module 10, according to an exemplary embodiment, includes a barrel 110, a filter 120, a spacer 130, a lens unit 140, a holder 150, and an image sensor 20.

The barrel 110 is substantially in the form of a hollow cylinder and is received in the holder 150. For example, the barrel 11 can be partially screwed into the holder 150. The barrel 11 is configured (i.e., structured and arranged) for receiving the filter 120, the spacer 130 and the lens unit 140 therein. The barrel 110 includes a first end 111 and an opposite second end 112. The first end 111 of the barrel 110 defines an aperture 113 therein. The aperture 113 is configured for receiving external light beams, which pass through the aperture 113 deeper into the lens module 10. A central axis of the aperture 113 and a central axis of the barrel 110 are essentially coaxial. The second end 112 is partially screwed into the holder 150.

The filter 120, the spacer 130 and the lens unit 140 are received in the barrel 110 along an optical axis in sequence from the first end 111 to the second end 112 of the barrel 110. The lens unit 140 includes one or more lens elements. The lens elements are usually made of glass and can be aspherical lenses or spherical lenses. The spacer 130 is configured for separating the lens unit 140 and the filter 120, thereby forming a space therebetween. The filter 120 is usually an infrared-cut filter. The filter 120 is configured for transmitting light in the visible spectrum while blocking light in the infrared spectrum, and is used to protect the image sensor 20 from interference caused by infrared radiation.

The holder 150 defines a cavity 151 therein. The cavity 151 is configured for partially receiving the barrel 110 and the image sensor 20 therein. The holder 150 includes a first end portion 152 and an opposite second end portion 153. The first end portion 152 of the holder 150 is coupled with the second end 112 of the barrel 110 so that the holder 150 engages with the barrel 110. For example, the second end 112 of the barrel 110 is partially screwed into the first end portion 152 of the holder 150.

The second end portion 153 of the holder 150 may be connected to other components. In the exemplary embodiment, the second end portion 153 of the holder 150 is disposed on a printed circuit board 22 having an image sensor 20 mounted thereon, thereby forming the lens module 10. Thus the image sensor 20 is received in the holder 150 and is disposed at the second end portion 153 of the holder 150. The optical components, such as the filter 120 and the lens unit 140, in the barrel 110 optically communicate with the image sensor 20 in the holder 150 to capture images. The image sensor 20 can be a charge coupled device (CCD) or a complementary metal oxide semiconductor (CMOS).

Furthermore, the holder 150 includes an outer surface 154 and an inner surface 155. The outer surface 154 has an electromagnetic shielding coating 30 formed thereon. The electromagnetic shielding coating 30 is configured for protecting the image sensor 20 from outside electromagnetic radiation, thereby improving imaging quality. A thickness of the electromagnetic shielding coating 30 is in a range from 1 to 100 microns.

The electromagnetic shielding coating 30 is comprised of a polymeric matrix and a number of carbon nanotubes dispersed in the polymeric matrix. The polymeric matrix can be selected from a group consisting of a thermoplastic resin, a thermosetting resin, an ultraviolet curable resin, and any combination thereof. For example, the thermoplastic resin can be an acrylic acid resin, the thermosetting resin can be an epoxy resin, and the ultraviolet curable resin can be a silicon resin. The carbon nanotubes can be single-walled carbon nanotubes or multi-walled carbon nanotubes.

An exemplary method for forming the electromagnetic shielding coating 30 on the outer surface 154 of the holder 150 includes the following steps.

Step 1: a liquid composite material comprised of a polymeric matrix and a number of carbon nanotubes is prepared.

Firstly, the polymeric matrix is dissolved into a solvent such as water, acetone, ethanol, isooctane and toluene, thus forming a mixture solution. Secondly, a number of carbon nanotubes are dispersed into the mixture solution using an ultrasonic dispersion process, thereby forming the liquid composite material comprised of the polymeric matrix and the carbon nanotubes dispersed in the polymeric matrix. A ratio of the carbon nanotubes to the polymeric matrix by weight is in a range from 0.1% to 20%.

Step 2: the liquid composite material comprised of the polymeric matrix and the carbon nanotubes is applied on the outer surface 154 of the holder 150 to form the electromagnetic shielding coating 30.

Firstly, the liquid composite material comprised of the polymeric matrix and the carbon nanotubes is applied on the outer surface 154 of the holder 150 by brushing coating, dipping coating or spray coating to form a preformed electromagnetic shielding coating. A thickness of the preformed electromagnetic shielding coating 30 is in a range from 1 to 100 microns. Secondly, the preformed electromagnetic shielding coating is cured under suitable conditions. For example, the preformed electromagnetic shielding coating can be cured under a heat if the polymeric matrix is a thermosetting resin, and the preformed electromagnetic shielding coating can be cured under an ultraviolet condition if the polymeric matrix is ultraviolet curable resin. During curing, because the solvent such as water, acetone, ethanol, isooctane and toluene in the liquid composite material is volatile, the solvent will be volatilized. Finally, the electromagnetic shielding coating 30 is formed on the outer surface 154 of the holder 150. The electromagnetic shielding coating 30 is capable of blocking EMI from outside the holder 150.

It is noted that the electromagnetic shielding coating 30 can be formed on the inner surface 155 of the holder 150 instead of the outer surface 154. It is also noted that the outer surface 154 and the inner surface 155 of the holder 150 can both have an electromagnetic shielding coating 30. An outer surface (not labeled) and an inner surface (not labeled) of the barrel 110 can also have electromagnetic shielding coatings 30 formed thereon. Thus, the capability of the lens module 10 for shielding outside electromagnetic radiation can further be enhanced, thereby enabling excellent imaging quality.

While certain embodiment has been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A lens module, comprising:
a plurality of optical components;
a barrel receiving the optical components therein;
an image sensor; and
a holder engaged with the barrel, the holder receiving the image sensor therein, the holder having an electromagnetic shielding coating formed thereon; the electromagnetic shielding coating being comprised of a polymeric matrix and a plurality of carbon nanotubes dispersed in the polymeric matrix and being configured for blocking electromagnetic radiation coming from outside the holder.

2. The lens module as claimed in claim 1, wherein the electromagnetic shielding coating is formed on at least one of an outer surface and an inner surface of the holder.

3. The lens module as claimed in claim 1, wherein the barrel has an electromagnetic shielding coating formed on at least one of an outer surface and an inner surface thereof.

4. The lens module as claimed in claim 1, wherein a thickness of the electromagnetic shielding coating is in a range from 1 to 100 microns.

5. The lens module as claimed in claim 1, wherein the polymeric matrix is selected from a group consisting of a thermoplastic resin, a thermosetting resin, an ultraviolet curable resin and any combination thereof.

6. The lens module as claimed in claim 1, wherein the polymeric matrix is selected from a group consisting of an acrylic acid resin, an epoxy resin, a silicon resin and any combination thereof.

7. The lens module as claimed in claim 1, wherein the carbon nanotubes are selected from a group consisting of single-walled carbon nanotubes and multi-walled carbon nanotubes.

8. The lens module as claimed in claim 1, wherein a ratio of the carbon nanotubes to the polymeric matrix by weight is in a range from 0.1% to 20%.

9. A holder used in a lens module, the holder comprising:
a hollow member defining a cavity for receiving an image sensor therein, the hollow member having an inner surface and an outer surface; and
an electromagnetic shielding coating formed on at least one of the inner surface and the outer surface of the hollow member for preventing electromagnetic radiation coming from outside the hollow member, the electromagnetic shielding coating being comprised of a polymeric matrix and a plurality of carbon nanotubes dispersed in the polymeric matrix.

10. The holder as claimed in claim 9, wherein a thickness of the electromagnetic shielding coating is in a range from 1 to 100 microns.

11. The holder as claimed in claim 9, wherein the polymeric matrix is selected from a group consisting of a thermoplastic resin, a thermosetting resin, an ultraviolet curable resin and any combination thereof.

12. The holder as claimed in claim 9, wherein the polymeric matrix is selected from a group consisting of an acrylic acid resin, an epoxy resin, a silicon resin and any combination thereof.

13. The holder as claimed in claim 9, wherein the carbon nanotubes are selected from a group consisting of single-walled carbon nanotubes and multi-walled carbon nanotubes.

14. The holder as claimed in claim 9, wherein a ratio of the carbon nanotubes to the polymeric matrix by weight is in range from 0.1% to 20%.

* * * * *